March 17, 1959  J. M. GOOGIN, JR  2,878,100
FORMATION OF URANIUM PRECIPITATES
Filed July 11, 1946
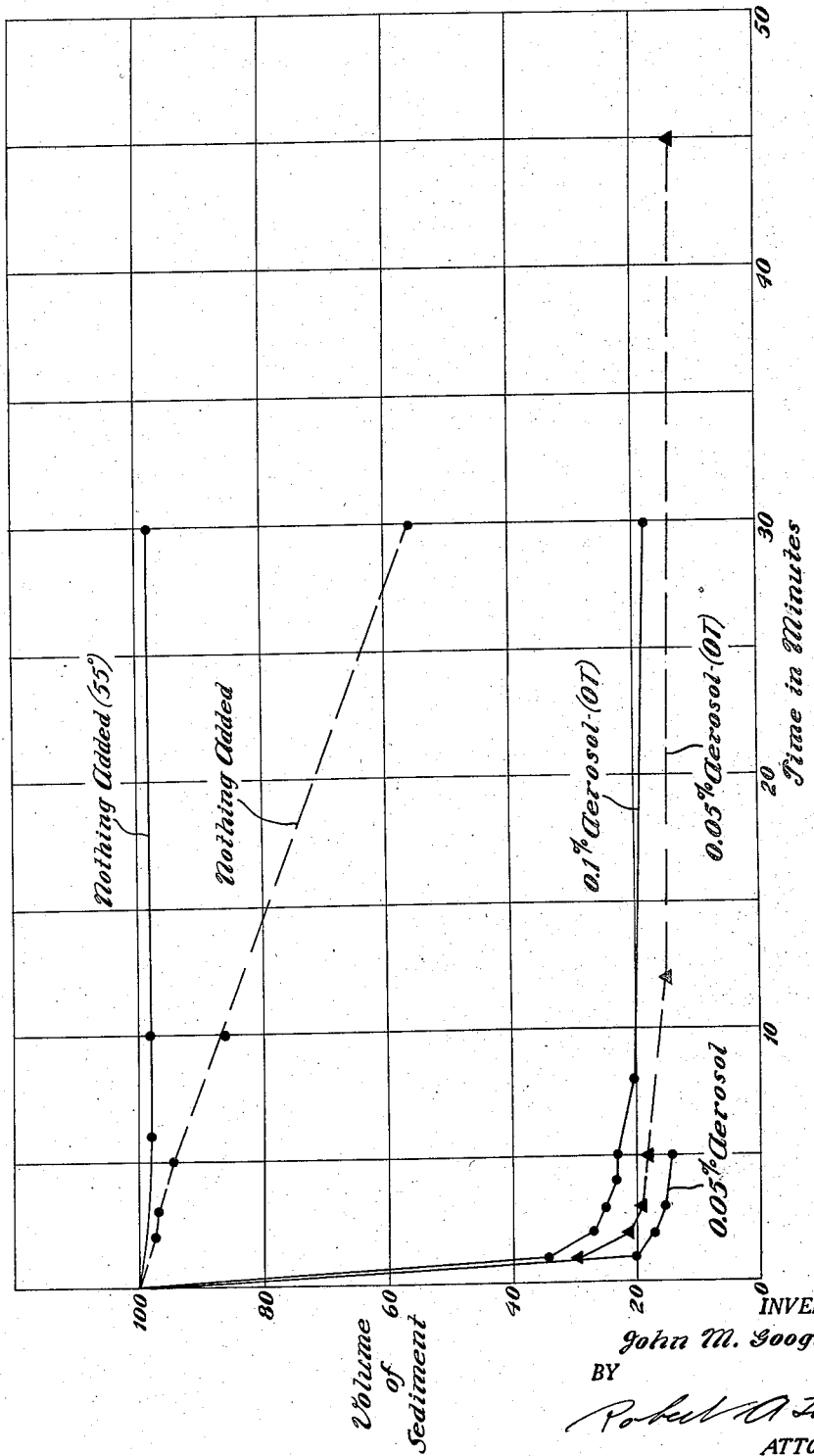
INVENTOR.
John M. Googin Jr.
BY
Robert A. Lavender
ATTORNEY United States Patent Office  2,878,100
Patented Mar. 17, 1959

2,878,100

FORMATION OF URANIUM PRECIPITATES

John M. Googin, Jr., Oak Ridge, Tenn., assignor, by mesne assignments, to the United States of America as represented by the United States Atomic Energy Commission Application July 11, 1946, Serial No. 682,805

14 Claims. (Cl. 23—14.5)

This invention relates to the formation of precipitates such as uranium oxide precipitates. More particularly, this invention concerns the formation of precipitates in separation and recovery processes applied to uranium in connection with separation and recovery thereof whereby the uranium may be recovered in the form of a precipitate of larger aggregates which facilitates washing, decantation, filtration, centrifugations, or other industrial operations utilized in such separation and recovery processes.

The production of U or solutions or liquids containing U values is not a part of the present invention, but is the invention of others. Detail disclosure relative to methods of obtaining liquids or solutions containing U is set forth in a number of copending applications, exemplified by Carter et al., Ser. No. 532,159, Ser. No. 559,624, now Patent No. 2,758,006, issued August 7, 1956 and Patent No. 2,855,270, issued October 7, 1958, respectively, and in other copending application disclosures to which reference may be made for information relative to the production of U, the composition of the various materials obtained and other such details. The present invention is not limited to the treatment of any particular liquid containing U, although it is particularly applicable for use in treating liquids containing U of the kind described in the aforementioned copending applications.

It is sufficient for the purposes of the present application to point out that various industrial processes exist which yield liquids or other materials having a content of U therein which it is desired to recover. As described in detail in the aforementioned Patent No 2,855,270, one of the steps in the separation and recovery of U may involve throwing down the U as a precipitate. While prior methods of precipitation have provided a very useful procedure for isolating the U, the precipitation of U peroxide ($UO_4 2H_2O$) on a large industrial scale has in some instances presented problems because of the formation of a gelatinous and nearly colloidal precipitate. From the industrial standpoint, the handling and separation of such gelatinous, colloidal precipitates consume considerable time if separation from the mother liquor is accomplished by filtration, decantation or combinations of such methods. In addition, because of the nature of the liquid containing said precipitate, problems are presented in the incorporation of reagents for attempting to improve the settling and filtration qualities. That is, due to the presence of hydrogen peroxide, for example, certain reagents which might normally function to aid in improving precipitate formation apparently are adversely affected by the presence of such components encountered in industrial large scale operation.

I have found, however, as will be set forth in detail hereinafter, that there are certain additions which may be made either before, during, or after precipitation to industrial liquids as above described whereby precipitation is greatly facilitated as evidenced by the obtaining of a precipitate in the form of larger and easily washable aggregates.

This invention has for one object to provide a method of forming precipitates.

Another object is to provide a method for better forming uranium peroxide precipitates in conjunction with processes for the separation and recovery of uranium.

Still another object is to provide a method for forming uranium peroxide precipitates whereby the precipitates are obtained in larger aggregates which permit better washing and separation by centrifugation or the like.

Still another object is to provide a method of forming improved and more easily separable uranium peroxide precipitates in liquids containing the uranium in the presence of numerous other components such as iron, chromium, nickel, and the like whether these other components be present in relatively small amounts or present in quantities which exceed the quantity of the uranium.

Another object is to provide additions for improving precipitate formation in the field indicated which function in the presence of hydrogen peroxide.

A still further object is to provide a method for forming a uranium peroxide precipitate which is susceptible of separation from its mother liquid in a relative short time.

Other objects will appear hereinafter.

I have found that the addition of certain surface active agents as will be described in detail hereinafter, usually lyophillic colloids under conditions of their use, especially in the presence of certain ions and substances, will make the peroxide precipitate of uranium form in larger aggregates than heretofore have been obtained. This is beneficial from the industrial standpoint in that such precipitates may be more easily washed and otherwise processed and more easily separated by decantation followed by filtration or by centrifugation.

A uranium peroxide precipitate may be produced by the reaction of a water solution of a suitable uranium salt, usually the chloride or nitrate, with hydrogen peroxide. The solution usually should be acid, preferably between pH of 1 and 3. Since the reaction produces hydrogen ion, a base is usually added at the same time as the hydrogen peroxide to prevent the pH from becoming too low. In accordance with the present invention, a surface active agent may be added either before precipitation is started or after formation of the precipitate. However, it has been found that in many instances the prior addition is more effective. Other ions or substances optionally used are generally better added before precipitation. Also, in general, the best results are obtained by adding the hydrogen peroxide and base slowly while maintaining the pH as nearly as possible at a constant value within the above-discussed range.

Of the additions discovered as particularly valuable, Aerosol C-61 (a sulfonated guanidine) and Aerosol OT (di-octyl sodium sulfo-succinate), have proved effective. However, there are numerous others, such as Nacconol N. R. (an alkyl aryl sulfonate), Aerosol 18 (N-octadecyl disodium sulfo-succinamate), gelatin, Agar-Agar, Aresket 300 (monobutyl diphenyl sodium sulfonate), G-2 800 (Atlas Powder Co.), Bone Glue grade C-2 (Armour), Santomose No. 3 (an alkyl aryl sulfonate), Tergitol Penetrant 4

Tergitol Penetrant 7

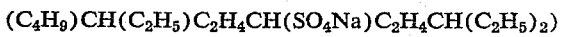

Nekal A (an alkyl aryl sulfonate), Triton 720, Triton 770, Triton 773 and Triton W-30 (aryl ether sulfonates). It will be noted, as the description proceeds, that all functioned even under conditions of the presence of excess hydrogen peroxide encountered industrially. Also, as will be pointed out, some of the reagents have been found better for filtration and retention improvement, while others are better for improving settling.

As apparent from the description which has thus far been set forth, it may be seen that my invention involves the utilization of certain surface active agents. The surface active agents which may be employed are, in general, commercially obtainable known chemical materials, hence the method of manufacture of such surface active agents or source of such materials is not a part of nor limitation on the present invention. For example, in Industrial and Engineering Chemistry, Industrial edition, for January, 1941, surface active agents and method of manufacture are described. Information relative to surface active agents is found in many patents such as 2,066,778; 2,241,605 and 2,117,378. However, it will be noted that in the prior art such agents have been used for dispersing purposes and the like rather than for purposes the same as in the present invention.

The concentration of U in the liquid under treatment apparently has only slight bearing on the effectiveness of the present invention, although there may be a decrease in effectiveness in concentrations much above 10%. The necessary concentration of surface active agent depends in part on the agent's individual characteristics and in part on the concentration of U. With an 8% U solution the concentration of Aerosol OT, for example, may be as low as 0.01%, but better results are obtained at 0.04%. Higher concentrations of Aerosol OT, such as 0.5% in 8% U solution, in some instances appear less effective.

In addition to adding one or more surface active agents as above described, the process may be further facilitated by other supplemental additions. This is illustrated by the following table, the data for which was obtained by preparing a relatively pure $UO_2(NO_3)_2 \cdot 6H_2O$ solution containing 8% U and containing 0.04% Aerosol OT. The solution was divided into the required number of lots and the indicated substances were added. The precipitations were then made at pH 1.5 to 2 by adding ammonium hydroxide and hydrogen peroxide simultaneously to the prepared solution. The characteristics, such as particle size and filtering rate, of each precipitate formed were visually compared to the precipitate obtained in the control solution and the results obtained are indicated in the column headed "Remarks."

TABLE A

| Run | Added Substance or Ion | Temperature, °C. | Remarks |
| --- | --- | --- | --- |
| 1 | None | 40-60 | Control. |
| 2 | 0.2% acetate | 40-60 | Better than 1. |
| 3 | 0.8% sulfate | 25-30 | Improvement but excess sulfate increases solubility of peroxide precipitate. |
| 4 | 0.2% tartrate | 25-30 | Improvement over control. |
| 5 | 0.2% citrate | 25-30 | Improved precipitate but excess increases solubility. |
| 6 | 0.1% oxalate | 25-30 | Do. |
| 7 | 0.1% dextrose | 25-30 | Do. |
| 8 | 1% glycerol | 25-30 | Improvement over control. |
| 9 | Small concentrations of some cations especially $Cu^{++}$ $Ba^{++}$ | 25-60 | Do. |

Certain ions, especially $Fe^{+++}$, may hamper the precipitation. Impurities in the U solution may modify the preferred concentrations given above. The precipitation using sulfate has been successful under even difficult conditions.

From the preceding description it is apparent that precipitates of the class indicated may be improved by the incorporation of certain surface active agents either alone or in conjunction with other additions as indicated.

Therefore, in general I have found that precipitates comprising uranium compounds may be improved, as evidenced by the precipitate settling faster, filtering and washing more readily and otherwise being more easily handled on an industrial scale, by the addition of one or more of the surface active agents described herein either alone or in conjunction with supplemental additions such as sources of sulfate ions. The agents employed in the practice of the present invention may be described as lyophillic colloids under the precipitation conditions usually existing when the uranium precipitate described herein has been or is being formed. That is, the conditions involve acid media and the presence of salt concentrations.

I have found that the agents employed in the practice of the present invention function to obtain the improvements above indicated even though the environment of use also contains excess hydrogen peroxide, copper, iron and various other extraneous components and impurities.

In large scale operations the U in acid solution is precipitated in the desired manner. However, in conjunction with the precipitation, preferably before or during, one or more of the above described additions of the present invention, namely a surface active agent which is a lyophillic colloid under the conditions of the reaction, is added in an amount, for example, of the order of .05%. The resultant uranium peroxide precipitates relatively quickly and cleanly separates thereby permitting the elimination of the bulk of the surrounding liquid by decantation or other simple procedure after which the remainder of the liquid may be simply separated from the precipitate by suitable means such as filtration through a rotary filter of usual commercial design, centrifugation and the like.

In order to illustrate more specifically one of the readily noticeable improvements that may be obtained there are presented below data exemplifying improvement which may be obtained in centrifuging speed. As indicated above, in processing certain liquids containing U by precipitating the U as the peroxide, particularly solutions containing a high content of iron, the crystals of uranium peroxide heretofore formed were too small for efficient industrial centrifuging. However, after utilizing the present invention in the processes of precipitating the U from such solution a satisfactory and speedy centrifuging slurry may be obtained as will be apparent from the data which follows.

In the preceding description it has been primarily indicated that the liquids, in addition to containing the U component, also contained peroxides and iron. However, these industrial liquids may also contain a number of other components such as copper, chromium, and nickel. The percentages of the U as well as the contaminating components will vary but for the purposes of illustration the following may be regarded as an exemplatory composition of a liquid which might be treated. The liquid contains U in the amount of about .1% by weight in the form of the nitrate, about .1% of iron, about .025% of copper, .0125% to .025% of chromium and .01% to .007% of nickel in the form of nitrates and/or chlorides soluble under the conditions obtaining. The improvement in centrifuging obtainable by addition of surface active agents as compared to the treatment of an aliquot of the same liquid in the absence of surface active agent is apparent from the following table:

Test I

| Run No. | Fe, Percent | Pptn. Temp., °C. | Percent Agent | Addition of agent | Time of Centrifugation |
|---|---|---|---|---|---|
| 95 | 0.1 | 25.0–28.0 | 0.05 Aerosol OT | After pptn | clear in 2 min. but not in 1. |
| 99 | 0.1 | 2.0 | None | | clear in 6 min. but not in 5. |
| 101 | 0.1 | 25.0–27.0 | 0.05 Duponol WS-WD | after pptn | clear in 45 sec. |
| 104 | 0.1 | 25.0–27.0 | 0.05 Tergitol Penetrant 7 | before pptn | clear in 3 min. but not 2. |
| 105 | 0.1 | 25.0–27.0 | 0.5 Tergitol Penetrant 7 | do | clear in 30 sec. |
| 107 | 0.1 | 2.0 | 0.05 T Gel | after pptn | Do. |
| 108 | 0.1 | 2.0 | 0.05 Areskap-50 | do | clear in 2 min. but not in 1. |
| 109 | 0.1 | 2.0 | 0.05 Triton W-30 | do | Do. |
| 110 | 0.1 | 2.0 | 0.05 Nekal A | do | clear in 30 sec. |

Following Test I, a second test was conducted wherein aliquots of the liquid utilized in Test I were taken, U values were precipitated in each aliquot at room temperature, the resulting suspension was cooled to 0° C., and aged for ½ hour. Following this, various surface active agents were added and each suspension was subjected to centrifugation with a conventional International #2 centrifuge operated at 800 R. P. M. The results are given in the following table.

Test II

| Run No. | Fe, Percent | Percent Agent | Time of Centrifugation |
|---|---|---|---|
| 1 | 0.1 | none | Clear in 6 min. but not in 5. |
| 2 | 0.1 | 0.05 Aerosol C-61 | Clear in 3 min. but not in 2. |
| 3 | 0.1 | 0.05 Agar Agar | Clear in 2 min. but not in 1. |
| 4 | 0.1 | 0.05 Aresket 300 | Clear in 3 min. but not in 2. |
| 5 | 0.1 | 0.05 Bone Glue C-2 | Do. |
| 6 | 0.1 | 0.05 Santomose 3 | Clear in 2 min. but not in 1. |
| 7 | 0.1 | 0.05 Tergitol Penetrant 4. | Do. |
| 8 | 0.1 | 0.05 Nacconal NRSF | Clear in 4 min. but not in 3. |
| 9 | 0.1 | 0.05 Triton 720 | Clear in 2 min. but not in 1. |
| 10 | 0.1 | 0.05 Triton 770 | Clear in 3 min. but not in 2. |
| 11 | 0.1 | 0.05 Triton 773 | Clear in 1 min. but not in ½. |

The advantages of the action of an agent in accordance with the present invention may also be noted graphically by reference to the attached drawing which forms a part of the present invention. From this drawing, which is self-explanatory from the legends appearing thereon, it will be seen that the sedimentation rate is considerably improved.

From the preceding examples it may be seen that incorporation of a surface active agent in uranium peroxide precipitation processes permits the separation of the resultant precipitate by decantation-filtration or centrifuging in considerably less time utilizing the same type of equipment, the same or lower centrifuge speed and other details of operation.

For a more complete illustration of the various ancillary steps which may accompany this particular step of incorporating the surface active agents, the following specific example is set forth describing the treatment of a liquid of the type indicated containing U in the presence of various impurities.

EXAMPLE I

In accordance with this example a solution known in the art as a gunk solution was treated. This solution contained less than 10 grams of U per liter.

Sulfuric acid was added to this gunk solution which was in an oxidized and filtered condition, with stirring, to provide a sulfate concentration between .07 to .09 M. Then the pH of the solution was adjusted with ammonia to between 1.9 to 2 and the solution cooled to below 25° C.

1% solution of Aerosol OT was added to provide a concentration of 0.050% on a weight basis. The uranium peroxide was precipitated by adding 30% hydrogen peroxide to the solution while continuing to hold the pH within the limits stated by the simultaneous addition of ammonium hydroxide. This addition of the peroxide was made over a quarter of an hour to avoid sudden temperature rise because of too rapid addition.

Thereafter the solution was cooled to around 2° C. and excess peroxide added in the amount of about 40 to 50 cc. of the peroxide per liter of the liquid being treated. This peroxide addition was accomplished by adding a portion thereof when the temperature of the liquid had been reduced to 20° C., another portion when the liquid had been reduced to 15° C., and another portion when the liquid had been reduced to 10° C. in order to correlate the excess peroxide addition with the cooling to 2° C.

The resultant slurry of the uranium peroxide formed as above described was ripened at about 2° C. for a half hour with stirring and then ripened further for a half hour without stirring. The precipitate formed was of such improved structure that the supernatant liquid could be relatively easily removed by decanting and the precipitate was easily finally separable on a standard rotary filter. Also the precipitate washed easily.

In the preceding example, while specific temperature conditions or other specific conditions have been described for illustrating my preferred embodiment, it is to be understood that the present invention has wider application. While the addition of relatively small amounts of the surface active agent have been indicated for illustrating preferred operation, larger amounts up to several percent may be added. Therefore, it is intended to broadly embrace a process of precipitating uranium peroxide or comparable precipitates from liquids of the class described where said precipitation is facilitated by means of surface active agents such as the Aerosols, and other agents described where a surface active agent alone is added or the surface active agent may optionally be added in the presence of the acetate, sulfates or other ions or substances fully described herein. The class of added ions may be generally described as polyvalent anions. These anions apparently may function in a plurality of respects. For example, they provide a medium for obtaining the lyophillic colloid condition aforementioned. They also appear to exhibit a beneficial effect as respects excess peroxide which might tend to inhibit the surface active agent, as discussed above.

In general, I have also found that the protein type agent, such as agar-agar, or the various esters and amides, either aryl or aliphatic, are particularly useful in situations where it is desired to improve filtration in dilute suspensions.

The sulfonic acid type agent, I have found, aids rapid flocculation and settling but may be less aid to filtration than the protein type aforementioned.

While the low temperature conditions are preferred, the invention is not limited in this respect since, particularly in the absence of iron, higher temperatures as, for example, 60° C. may be utilized satisfactorily. Low temperature precipitation, per se, is not claimed herein but, as indicated, is the invention of others.

It is to be understood that all matters contained in the above description and examples are illustrative only and do not limit the scope of this invention as it is intended to claim the invention as broadly as possible in view of the prior art.

I claim:

1. In a process for removing uranium values from an aqueous solution containing the same, comprising precipitating the uranium values in said solution and thereafter separating the resulting uranium precipitate from the supernatant solution, the improvement step for causing the uranium precipitate to form into larger aggregates, to thereby enhance its settling and filtration qualities, which comprises subjecting the precipitate, prior to so separating it from the solution, to the action of a surface active organic sulfonate incorporated in said solution.

2. In a process for removing uranium values from an aqueous solution containing the same, comprising precipitating the uranium values as uranium peroxide in said solution and thereafter separating the resulting uranium peroxide precipitate from the supernatant solution, the improvement step for causing the uranium peroxide precipitate to form into larger aggregates, to thereby enhance its settling and filtration qualities, which comprises subjecting the precipitate, prior to so separating it from the solution, to the action of a surface active organic sulfonate incorporated in said solution.

3. The process of claim 2 wherein said surface active organic sulfonate is a lyophillic colloid under the conditions of the precipitation.

4. The process of claim 2 wherein said surface active organic sulfonate is a sulfonated ester.

5. The process of claim 2 wherein said surface active organic sulfonate is a sulfonated bicarboxyacid ester.

6. The process of claim 2 wherein said surface active organic sulfonate is di-octyl sodium sulfo-succinate.

7. The process of claim 2 wherein said surface active organic sulfonate is N-Octadecyl disodium sulfo-succinamate.

8. In a process for removing uranium values from an aqueous solution containing the same, comprising precipitating the uranium values as uranium peroxide in said solution and thereafter separating the resulting uranium peroxide precipitate from the supernatant solution, the improvement step for causing the uranium precipitate to form into larger aggregates, to thereby enhance its settling and filtration qualities, which comprises subjecting the precipitate, prior to so separating it from the solution, to the combined action of a surface active organic sulfonate and a source of polyvalent anion, both incorporated in said solution.

9. The process of claim 8 wherein said polyvalent anion is chosen from the group consisting of soluble acetates, sulfates, citrates, and oxalates.

10. The process of claim 8 wherein said polyvalent anion is sulfate ion.

11. In a process for removing uranium values from an aqueous solution containing the same, comprising precipitating the uranium values as uranium peroxide in said solution by means of incorporating hydrogen peroxide therein, and thereafter separating the resulting uranium peroxide precipitate from the supernatant solution, the improvement operation for causing the uranium peroxide precipitate to form into larger aggregates, to thereby enhance its settling and filtration qualities, which comprises maintaining the pH of the solution substantially within the range of pH 1 to 3 during said precipitation, and subjecting the precipitate, prior to so separating it from the solution, to the action of a surface active organic sulfonate incorporated in said solution to a concentration of the order of 0.01 to 0.05 percent by weight.

12. In a process for removing uranium values from an aqueous acidic solution containing the same, comprising precipitating uranium values as uranium peroxide in said solution by means of incorporating hydrogen peroxide therein, and thereafter separating the resulting uranium peroxide precipitate from the supernatant solution, the improvement operation for causing the uranium peroxide precipitate to form into larger aggregates, to thereby enhance its settling and filtration qualities, which comprises maintaining the pH of the solution within the approximate range of pH 1 to 3 by means of an addition of ammonium hydroxide thereto and maintaining the temperature of the solution below 25° C. during the precipitation, and subjecting the precipitate, prior to so separating it from the solution, to the action of a surface active sulfonated bicarboxyacid ester incorporated in said solution.

13. In a process for removing uranium values from an aqueous acidic solution containing the same, comprising precipitating the uranium values, as uranium peroxide, in said solution by means of incorporating hydrogen peroxide therein, and thereafter separating the resulting uranium peroxide precipitate from the supernatant solution, the improvement operation for causing the uranium peroxide precipitate to form into larger aggregates, to thereby enhance its settling and filtration qualities, which comprises maintaining the pH of the solution within the approximate range 1 to 3 by means of addition of ammonium hydroxide thereto and maintaining the temperature of the solution below 25° C. during the precipitation, and, prior to so separating the precipitate from the solution, subjecting the precipitate to the action of a surface active sulfonated bicarboxyacid ester incorporated in said solution, and ripening the precipitate by maintaining it as a slurry wth the solution at a temperature below 10° C.

14. In a process for the decontamination and recovery of uranium values from an aqueous acidic solution containing the same together with iron, copper, chromium, and nickel contamination, comprising precipitating uranium values as uranium peroxide in said solution by means of incorporating hydrogen peroxide therein while maintaining the pH of the solution within the approximate range pH 1 to 3, and thereafter separating the uranium peroxide precipitate from the supernatant solution, the improvement step for causing the uranium precipitate to form into larger aggregates, to thereby enhance its settling and filtration qualities, which comprises subjecting the precipitate, prior to so separating it from the solution, to the action of a surface active organic sulfonate, incorporated in the solution, which is a lyophillic colloid under the conditions of the precipitation.

References Cited in the file of this patent

UNITED STATES PATENTS

| | | |
|---|---|---|
| 2,000,656 | Armstrong et al. | May 7, 1935 |
| 2,044,942 | Heckert | June 23, 1936 |

OTHER REFERENCES

Friend: "Textbook of Inorganic Chemistry" vol. 7, part 3, page 311, 1926, publ. by Charles Griffin & Co., Ltd., London.